(12) United States Patent
Sturley

(10) Patent No.: US 6,828,043 B2
(45) Date of Patent: Dec. 7, 2004

(54) LUMINOUS PANEL

(76) Inventor: David K. Sturley, 2611 W. Fourteen Mile Rd., Royal Oak, MI (US) 48073

( * ) Notice: Subject to any disclaimer, the term of this patent is extended or adjusted under 35 U.S.C. 154(b) by 29 days.

(21) Appl. No.: 09/810,353

(22) Filed: Mar. 16, 2001

(65) Prior Publication Data

US 2002/0132135 A1 Sep. 19, 2002

(51) Int. Cl.$^7$ .............................. F21K 2/00; G09F 13/20
(52) U.S. Cl. ........................ 428/690; 428/204; 428/207; 428/323; 428/328; 428/917; 428/330; 40/542; 40/543; 250/462.1; 250/483.1
(58) Field of Search ................................ 428/204, 207, 428/323, 328, 330, 917, 690; 40/542, 543; 250/462.1, 487.1, 483.1, 484.4; 313/502; 252/301.4 R

(56) References Cited

U.S. PATENT DOCUMENTS

| | | | | |
|---|---|---|---|---|
| 5,376,303 A | * | 12/1994 | Royce et al. | ......... 252/301.4 R |
| 5,811,174 A | * | 9/1998 | Murakami | ................... 428/195 |
| 5,885,486 A | * | 3/1999 | Hao et al. | ................ 252/307.4 |
| 6,177,029 B1 | * | 1/2001 | Kaz et al. | .............. 252/301.33 |
| 6,375,864 B1 | * | 4/2002 | Phillips et al. | ......... 252/301.33 |
| 6,617,784 B1 | * | 9/2003 | Abe et al. | .................... 313/506 |
| 2001/0010367 A1 | * | 8/2001 | Burnell-Jones | ........ 252/301.36 |
| 2001/0015623 A1 | * | 8/2001 | Takada et al. | .............. 313/586 |

FOREIGN PATENT DOCUMENTS

FR    2054877 A    *    4/1971

* cited by examiner

*Primary Examiner*—Dawn Garrett
(74) *Attorney, Agent, or Firm*—Michael D. Wiggins

(57) ABSTRACT

A non-powered composite luminous panel including two plates of light transmissive material and the interlayer of a luminescent material provided between the two plates. The luminescent material includes a light transmissive resinous material and contains a suspension of luminescent particles, preferably of the long acting emitting type.

15 Claims, 1 Drawing Sheet

LUMINOUS PANEL

BACKGROUND OF THE INVENTION

1. Field of the Invention

The present invention relates to non-powered luminous flat panels for use as signs, decorations and markings.

2. Prior Art

In the prior art, there exists luminous panels which are used for signs, decorations and markings. However, the luminous panels of the prior art are usually powered and require electricity. Such panels are either electroluminescent, light emitting diode, neon, incandescent or fluorescent. In other words, these flat panels include as a light source an electroluminescent element, light emitting diodes, neon signs, incandescent light bulbs or fluorescent light bulbs.

The above forms of luminescent panels have several problems and inconveniences. In particular, they are usually required to be quite thick, they require the routing of a power source to them and they are usually fragile and need their light source elements replaced on a regular basis. As a result, these types of powered luminescent panels cannot be placed in areas where there is no power available, they are exposed to harsh weather or where they are subject to high weight loads.

SUMMARY OF THE INVENTION

Accordingly, it is a general object of the present invention to overcome the disadvantages and problems of the prior art.

In particular, it is a specific object of the present invention to provide a luminous panel which does not require power and is rugged in its construction.

The objects of the present invention are accomplished by a unique composite or laminated non-powered luminous panel which consists of a piece of light transmissive material and a layer of a luminescent material provided on one side of the piece of light transmissive material. The luminescent material comprises a light transmissive resinous material containing a suspension of luminescent particles. The luminescent particles are preferably long decay phosphors and photostorage and emissive materials which absorb light energy and re-emitted for long periods of time.

BRIEF DESCRIPTION OF THE DRAWINGS

The above-mentioned features and objects of the present invention will become more apparent with reference to the following description taken together with the accompanying drawings wherein like reference numerals denote like elements and in which.

DETAILED DESCRIPTION OF THE INVENTION

Figure 1:
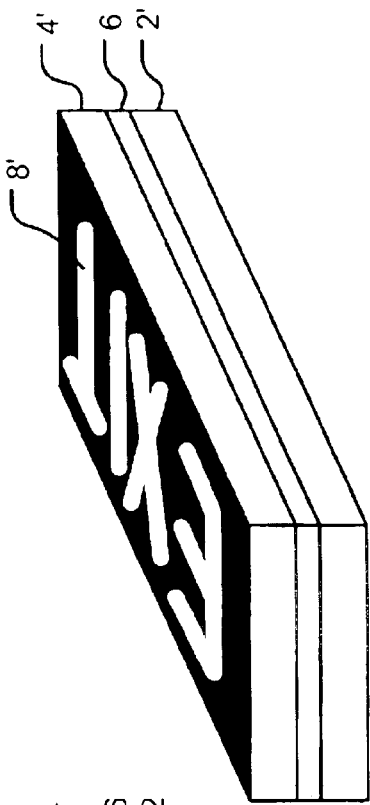
FIG. 1 is a perspective view of a first embodiment of the present invention.

Referring to FIG. 1, shown therein is a first embodiment of a non-powered luminous panel in accordance with the teachings of the present invention. In FIG. 1, the non-powered luminous panel comprises a bottom plate 2 and a top plate 4. In this embodiment, the plates 2 and 4 are illustrated as being rectangular, but they could just as easily be circular, square or some other desired shape. The plates 2 and 4 are made from a transparent or translucent material such as glass or plastic and at least the top surface of plate 2 and the bottom surface of plate 4 are substantially flat. Interlayer 6 of a luminescent resinous material is provided between the plates 2 and 4. The layer of luminescent resinous material 6 can be coated onto the plate 2 by any known method and then the plate 4 placed on top of the layer 6. The luminous panel may be of any thickness depending on the use, but is preferably in the range of $\frac{3}{16}$" to $1\frac{1}{4}$".

The layer 6 is of clear resinous material such as polyester or styrene resins with a dispersion of luminescent particles therein. The resinous material need only be light transmissive, capable of curing by heat, infrared, x-rays, ultraviolet light, passage of time, etc., act as an adhesive and be compatible with the particles of luminescent material.

The resinous material which forms the interlayer 6 is typically formed by adding about 50 grams of luminescent particles to 1000 cc of resinous material. To this, small amounts of additives may be mixed into the resinous materials. Such additives include an adhesion promoter and catalyst to cause the resinous material to harden. The thickness of the interlayer depends upon the application and is preferably in the range equal to 0.010 to 0.150 inches. However, the greater the thickness of the interlayer 6, the greater is the chance of a deflection of the interlayer 6 which may result in a breaking of one or both of the plates 2 and 4.

Suitable luminescent particles are those such as the long decay phosphors of U.S. Pat. No. 5,376,303, the long afterglow phosphor of U.S. Pat. No. 5,885,483 and the photostorage and emissive material of U.S. patent application Ser. No. 09/166,199, which was filed on Oct. 5, 1999. The long decay phosphor of U.S. Pat. No. 5,376,303 is comprised of MO•a(Al$_{1-b}$B$_b$)$_2$O$_3$:cR wherein:

$0.5 \leq a \leq 10.0$, $0.0001 \leq b \leq 0.5$ and $0.0001 \leq c \leq 0.2$,

MO represents at least one divalent metal oxide selected from the group consisting of MgO, CaO, SrO and ZnO and R represents Eu and at least one additional rare earth element selected from the group consisting of Pt, Nd, Dy and Tm. In U.S. Pat. No. 5,885,483, the long afterglow phosphor comprises a sinter expressed by a general formula MO•(n-x){a Al$_2$O$_3^\alpha$÷(1-a)Al$_2$O$_3^\gamma$}B$_2$O$_3$:R wherein M represents an alkaline earth metal, R represents a rare earth element, $0.5 < a \leq 0.99$, $0.001 \leq x \leq 0.35$, $1 \leq n \leq 8$ and a part of M may be replaced with at least one alkaline earth metal selected from the group consisting of Mg, Ca and Ba. The photostorage and emissive material of U.S. patent application Ser. No. 09/166,199 is composed of luminescent material which absorbs light from a light source and re-emits the light energy in a first wavelength spectrum when the light source is removed mixed with a material selected from the group consisting of fluorescent colorants and optical brighteners which are excited by absorbing light at the first wavelength spectrum and re-emitting the absorbed light at a second wavelength spectrum.

In use, the non-powered luminous panel absorbs light energy into the luminous particles contained in the interlayer 6. The light energy is thereby stored in the interlayer 6 and continues to be stored so long as the source of light is present. Once the source of light is removed by either the sun going down, the other powered sources of light energy being normally turned off or by the other powered sources of light energy being turned off by power failure or other emergency, the interlayer 6 will emit light energy in the visible spectrum and the non-powered luminous panel will be easily visible. Still further and as is shown in FIG. 1, indicia such as letters 8 which form either a direction or emergency notice sign such as the letters EXIT can be printed in opaque letters on the top surface of the plate 4. In this way, when the interlayer 6 is emitting its light energy in the visible spectrum, the indicia 8 will be easily seen and the sign easily read.

Figure 2:
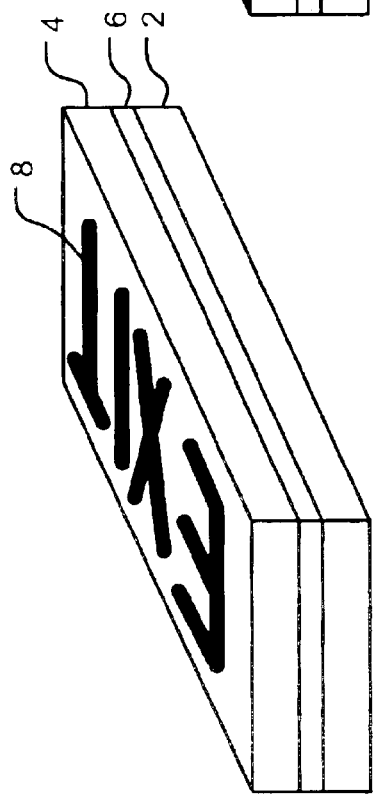
FIG. 2 is a perspective view of a second embodiment of the present invention.

Referring to FIG. 2, shown therein is a second embodiment of the present invention. In this second embodiment, all of the elements are formed substantially the same way except that the plate 2' is made thinner in FIG. 2 than the plate 2 in FIG. 1, the plate 4' is made thicker than the plate 4 in FIG. 1 and the indicia 8' are formed in inverse. By varying the relative thickness of the plates, it is possible to change the strength of the overall luminous plate to suit the particular application. Also by printing the indicia in reverse such as the indicia 8' in FIG. 2, the luminous light energy in the visible spectrum will be visible from the luminous panel as letters which in some situations or circumstances may be more visible than the construction shown in FIG. 1.

Figure 3:
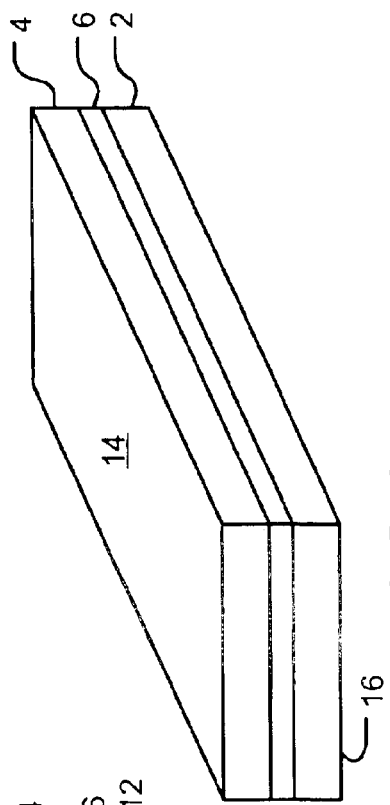
FIG. 3 is a perspective view of a third embodiment of the present invention.

Referring to FIG. 3, shown therein is a third embodiment of the present invention. In this third embodiment, the bottom plate 2 is eliminated. In its place, a protective layer 12 is provided. This protective layer may comprise aluminum or tin foil or a suitable plastic film and protects the bottom surface of the interlayer 6. Otherwise, the embodiment of FIG. 3 functions in the same way the embodiments of FIGS. 1 and 2. However, this embodiment only emits light from one side.

Figure 4:
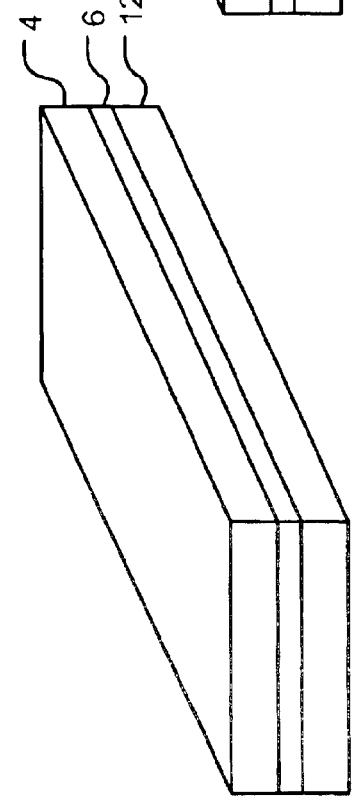
FIG. 4 is a perspective view of a fourth embodiment of the present invention.

Referring to FIG. 4, shown therein is a fourth embodiment of the present invention. In this embodiment, the top surface 14 of the top plate 4 and/or bottom surface 16 of the bottom plate 2 may be half silvered in order to allow light to enter the non-powered luminescent plate but be reflected or trapped between the top and bottom plates 2 and 4 by the partial or half silvered layers 14 and 16. In this way, the light capturing ability of the non-powered luminous plate may be enhanced.

Still further, in other applications, the top or bottom surface of the plate 2 which is contact with the interlayer 6 could be provided with a completely mirrored surface. By providing the completely mirrored surface, all of the light which would be emitted by the interlayer 6 would be reflected by the mirror and only come out of the top surface 14 of the upper plate 4. Still further and in other embodiments, the interlayer 6 further comprises reflective particles to further enhance the emission of light and to provide a more aesthetic appearance.

Finally, by the utilization of the photostorage and emissive material of U.S. Ser. No. 09/166,199, it is possible to provide an interlayer 6 which is of different colors. In other words, the interlayer 6 can be any colors such as red, green, blue, purple, etc. By utilizing the photostorage and emissive material of U.S. application Ser. No. 09/166,199, the color of the luminous panel and the color of the light emitted from the non-powered luminous panel can be selected based upon esthetics or the use. Particularly, for emergency signs or uses, it may be desirable to provide the interlayer 6 in red. Finally, in some applications, it may be useful to utilize a colored light transmissive material for the plates 2 and 4, depending on the use and the aesthetics.

It should be apparent to those skilled in the art that the uses of the non-powered electroluminescent panel of the present invention is particularly broad. In particular, because of the varying ways in which the luminous panel of the present invention can be manufactured, such non-powered luminous panels can be used for safety, novelty and decoration. For commercial uses, it can be used as an interior or exterior glazing and provide navigational light and security in entrances and atriums. In public parking structures, it can be mounted to walls and handrails for navigational and direction and include letters and arrows to further enhance the security and safety of the parking structure. Still further, it can be installed on the vertical risers of steps and stairways to easily mark the steps and thereby increase the safety in both commercial and residential settings. Its other uses including but are not limited to are pavers made entirely of light transmissive material or composites of brick, mortar, and/or cement with a portion made of light transmissive material embedded therein to mark sidewalks and driveways, table tops, shower door glass, doors and door moldings, lens covers for incandescent and fluorescent lights, light shades and commercial signage.

It should be apparent to those skilled in the art that the above-described embodiments are merely illustrative and few of the embodiments which fall within the scope of the present invention. Numerous and various other arrangements can be readily devised by those skilled in the art without departing from the spirit and scope of the invention.

I claim:
1. A composite non-powered luminous panel comprising:
   a first planar, light transmissive material that includes glass;
   a second planar, light transmissive material that includes glass; and
   a continuous planar layer of luminous material located between and in contact with the first and second planar light transmissive materials, wherein the luminous material includes a light transmissive resinous material containing a suspension of luminescent particles.
2. The non-powered composite luminous panel of according to claim 1 wherein the layer of luminous material contains about 50 grams of the luminescent particles per 1000 cc of the light transmissive resinous material.
3. A composite non-powered luminous panel comprising:
   a first planar light transmissive material that includes glass;
   a second planar light transmissive material that includes glass; and
   a continuous planar layer of luminous material located between the first and second planar light transmissive materials, wherein the luminous material includes a light transmissive resinous material containing a suspension of luminescent particles,
   wherein the continuous layer of luminous material has a thickness in the range of 0.010 to 0.150 inches.
4. A composite non-powered luminous panel comprising:
   a first planar light transmissive material that includes glass;
   a second planar light transmissive material that includes glass; and
   a continuous planar layer of luminous material located between the first and second planar light transmissive materials, wherein the luminous material includes a light transmissive resinous material containing a suspension of luminescent particles,
   wherein the resinous material comprises a clear polyester or styrene resin.

5. A composite non-powered luminous panel comprising:

a first planar light transmissive material that includes glass;

a second planar light transmissive material that includes glass;

a continuous planar layer of luminous material located between the first and second planar light transmissive materials, wherein the luminous material includes a light transmissive resinous material containing a suspension of luminescent particles; and indicia printed on the luminous panel.

6. The non-powered composite luminous panel according to claim 1 wherein the luminous particles are comprised of MO•a(Al$_{1-b}$B$_b$)$_2$O$_3$:cR wherein: $0.5 \leq a \leq 10.0$, $0.0001 \leq b \leq 0.5$ and $0.01 \leq c \leq 0.2$, MO represents at least one divalent metal oxide selected from the group consisting of MgO, CaO, SrO and ZnO and R represents Eu and at least one additional rare earth element selected from the group consisting of Pt, Nd, Dy and Tm.

7. The non-powered composite luminous panel according to claim 1 wherein the luminescent particles are comprised of a sinter expressed by a general formula MO•(n-x){aAl$_2$O$_3^\alpha$÷(1-a)Al$_2$O$_3^\gamma$}B$_2$O$_3$:R wherein M represents an alkaline earth metal, R represents a rare earth element, $0.5 < a \leq 0.99$, $0.001 \leq x \leq 0.35$, and $1 \leq n \leq 8$.

8. A composite non-powered luminous panel comprising:

a first planar light transmissive material that includes glass;

a second planar light transmissive material that includes glass; and a continuous planar layer of luminous material located between the first and second planar light transmissive materials, wherein the luminous material includes a light transmissive resinous material containing a suspension of luminescent particles, wherein the luminous particles comprise a luminescent material which absorbs light from a light source and reemits the light energy in a first wavelength spectrum when the light source is removed mixed with a material selected from the group consisting of fluorescent colorants and optical brighteners which are excited by absorbing light at a first wavelength spectrum and reemitting the absorbed light at a second wavelength spectrum.

9. The composite non-powered luminous panel of claim 1 wherein a partial or half silvered layer is provided on the exterior surface of at least one of the first planar light transmissive material and the second planar light transmissive material.

10. The non-powered composite luminous panel according to claim 1 wherein one surface of the second planar light transmissive material is provided with a completely mirrored surface.

11. A composite non-powered luminous panel comprising:

a first planar light transmissive material that includes glass;

a second planar light transmissive material that includes glass; and a continuous planar layer of luminous material located between the first and second planar light transmissive materials, wherein the luminous material includes a light transmissive resinous material containing a suspension of luminescent particles, wherein the first and second planar light transmissive materials have a combined thickness that is greater than 0.0375 inches and less than 1.24 inches.

12. The composite non-powered luminous panel of claim 11 wherein the continuous layer of luminous material has a thickness in the range of 0.010 to 0.150 inches.

13. The composite non-powered luminous panel of claim 11 wherein the luminous material contains about 50 grams of the luminescent particles per 1000 cc of the light transmissive resinous material.

14. The non-powered composite luminous panel according to claim 11 wherein the luminous particles are comprised of MO•a(Al$_{1-b}$B$_b$)$_2$O$_3$:cR wherein: $0.5 \leq a \leq 10.0$, $0.0001 \leq b \leq 0.5$ and $0.01 \leq c \leq 0.2$, MO represents at least one divalent metal oxide selected from the group consisting of MgO, CaO, SrO and ZnO and R represents Eu and at least one additional rare earth element selected from the group consisting of Pt, Nd, Dy and Tm.

15. The non-powered composite luminous panel according to claim 11 wherein the luminescent particles are comprised of a sinter expressed by a general formula MO•(n-x){aAl$_2$O$_3^\alpha$÷(1-a)Al$_2$O$_3^\gamma$}B$_2$O$_3$:R wherein M represents an alkaline earth metal, R represents a rare earth element, $0.5 < a \leq 0.99$, $0.001 \leq x \leq 0.35$, $1 \leq n \leq 8$.

* * * * *